US006868389B1

(12) United States Patent
Wilkins et al.

(10) Patent No.: US 6,868,389 B1
(45) Date of Patent: Mar. 15, 2005

(54) INTERNET-ENABLED LEAD GENERATION

(75) Inventors: Jeffrey Kohl Wilkins, Austin, TX (US); Jack Marshall Zoken, San Rafael, CA (US)

(73) Assignee: Jeffrey K. Wilkins, Austin, TX (US)

( * ) Notice: Subject to any disclaimer, the term of this patent is extended or adjusted under 35 U.S.C. 154(b) by 0 days.

(21) Appl. No.: 09/484,861

(22) Filed: Jan. 18, 2000

Related U.S. Application Data

(60) Provisional application No. 60/116,445, filed on Jan. 19, 1999.

(51) Int. Cl.[7] ................................................ G06F 17/60

(52) U.S. Cl. .................................. 705/10; 705/7; 705/1

(58) Field of Search ........................... 705/10, 7, 1, 500

(56) References Cited

U.S. PATENT DOCUMENTS

| | | | | |
|---|---|---|---|---|
| 3,639,686 A | * | 2/1972 | Walker et al. | 725/20 |
| 4,839,853 A | | 6/1989 | Deerwester et al. | 364/900 |
| 5,124,911 A | * | 6/1992 | Sack | 705/10 |
| 5,446,919 A | | 8/1995 | Wilkins | 455/6.2 |
| 5,619,709 A | | 4/1997 | Caid et al. | 395/794 |
| 5,675,662 A | | 10/1997 | Deaton et al. | 382/137 |
| 5,724,571 A | | 3/1998 | Woods | 395/605 |
| 5,751,961 A | | 5/1998 | Smyk | 395/200.47 |
| 5,754,938 A | | 5/1998 | Herz et al. | 455/4.2 |
| 5,774,868 A | | 6/1998 | Cragun et al. | 705/10 |

(List continued on next page.)

FOREIGN PATENT DOCUMENTS

| | | | | |
|---|---|---|---|---|
| EP | WO 85/03152 | * 7/1985 | G06F/15/20 |
| EP | 0 206 565 A2 | * 12/1986 | G06F/15/21 |
| GB | 2 105 075 | * 5/1981 | G09F/9/00 |

OTHER PUBLICATIONS http://webarchive.org/web/19980624104237/http://www.weddinghelpline.com/, Jun. 24, 1998.*

Budi Yuwono et al., "Search and ranking algorithms for locating resources on the world wide web," proceedings of Twelfth International Conference on Data Engineering, pp. 164–171, IEEE 1996.

*Primary Examiner*—Tariq R. Hafiz
*Assistant Examiner*—Akiba K Robinson-Boyce
(74) *Attorney, Agent, or Firm*—Lumen Intellectual Property Services, Inc.

(57) ABSTRACT

A method of generating intender leads in a distributed computer system includes the steps of identifying purchase indicators and extracting prospect identifiers from the purchase indicators. Purchase indicators are pieces of data that represent a potential future purchase by a prospect. For example, an online classified advertisement selling an automobile is a purchase indicator for a potential future purchase of a new car by the old car seller. The prospect identifier, such as a telephone number or email address, uniquely identifies the prospect likely to make the future purchase. Preferably, the method also contains the steps of obtaining full contact information for the prospect from a profile database, applying a predictive model to the prospects to select intender leads, and transferring the intender leads to an interested party, such as a direct marketing service or sales force. An intender lead is a lead for a person intending to make a purchase of a particular product or service within a given time period. Only some of the prospects are actual intenders. Preferably, the method also includes the steps of extracting auxiliary data that is independent of the prospect from the purchase indicator, and obtaining data enhancement information about the prospect from data enhancement databases. The predictive model is preferably also applied to the data enhancement information and auxiliary data. The method is particularly well-suited for the Internet, which is a large source of publicly-available purchase indicators that is constantly updated. The intender leads are preferably transferred over the Internet, e.g. by email, so that they arrive at the sales force when they are still "hot."

21 Claims, 8 Drawing Sheets

U.S. PATENT DOCUMENTS

| | | | | | |
|---|---|---|---|---|---|
| 5,855,008 | A | * | 12/1998 | Goldhaber et al. | 705/14 |
| 5,893,075 | A | * | 4/1999 | Plainfield et al. | 705/14 |
| 5,930,764 | A | * | 7/1999 | Melchione et al. | 705/10 |
| 5,963,915 | A | * | 10/1999 | Kirsch | 705/26 |
| 6,067,525 | A | * | 5/2000 | Johnson et al. | 705/10 |
| 6,078,892 | A | * | 6/2000 | Anderson et al. | 705/10 |
| 6,119,101 | A | * | 9/2000 | Peckover | 705/26 |
| 6,134,532 | A | * | 10/2000 | Lazarus et al. | 705/14 |
| 6,236,977 | B1 | * | 5/2001 | Verba et al. | 705/10 |
| 6,286,005 | B1 | * | 9/2001 | Cannon | 707/100 |
| 6,321,205 | B1 | * | 11/2001 | Eder | 705/7 |

* cited by examiner

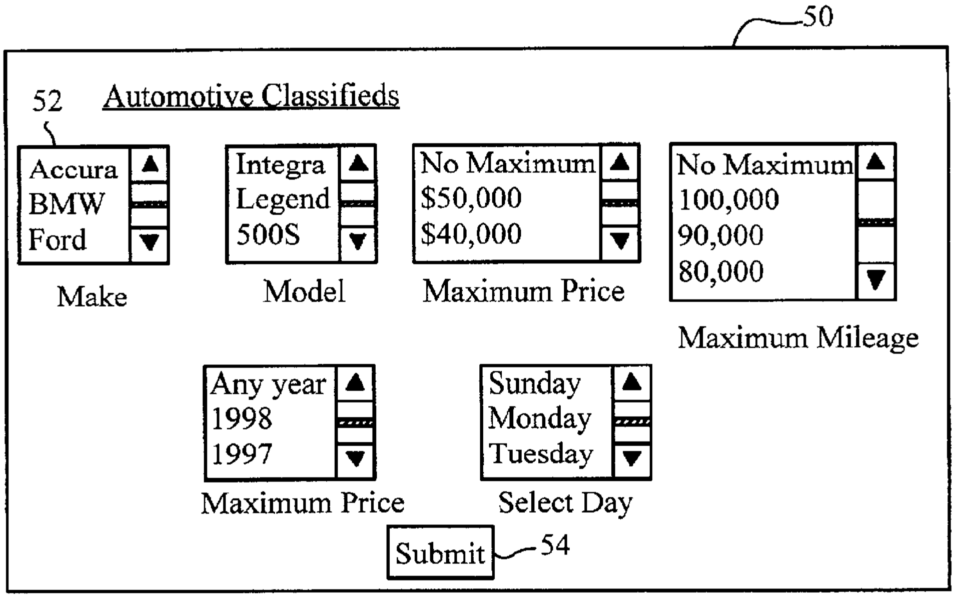

*FIG. 3* PRIOR ART

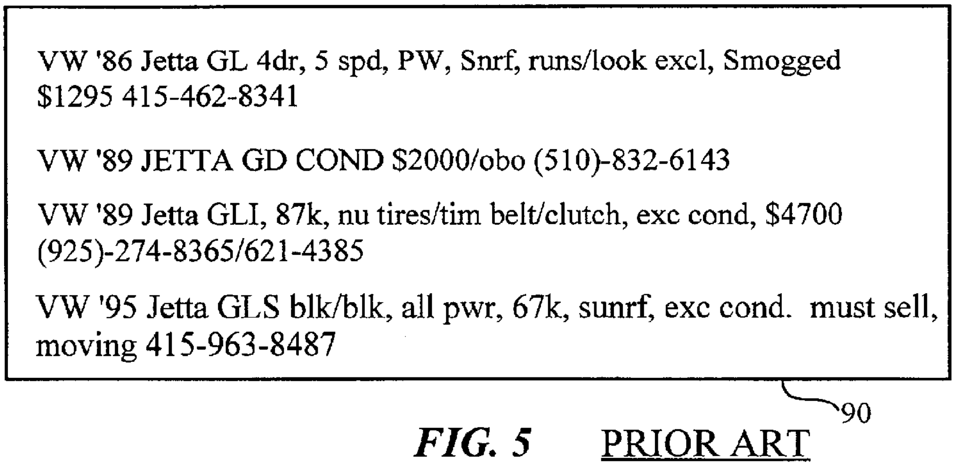

*FIG. 5* PRIOR ART

Automotive Classifieds (52)

| Make | Model | Maximum Price | Maximum Mileage |
|---|---|---|---|
| Accura / BMW / Ford | Integra / Legend / 500S | No Maximum / $50,000 / $40,000 | No Maximum / 100,000 / 90,000 / 80,000 |

Maximum Price: Any year / 1998 / 1997
Select Day: Sunday / Monday / Tuesday

Submit — 54

---

VW '86 Jetta GL 4dr, 5 spd, PW, Snrf, runs/look excl, Smogged $1295 415-462-8341

VW '89 JETTA GD COND $2000/obo (510)-832-6143

VW '89 Jetta GLI, 87k, nu tires/tim belt/clutch, exc cond, $4700 (925)-274-8365/621-4385

VW '95 Jetta GLS blk/blk, all pwr, 67k, sunrf, exc cond. must sell, moving 415-963-8487

— 90

120

Volkswagen Jetta - 1998 Alameda, California

Description: MUST SELL! Black 1998 VW Jetta GT, 5-speed, air conditioning, anti-lock brakes, air bags, keyless entry, power steering, alloy wheels, cruise control, and much more. Switching jobs and cannot afford to keep it! MOTIVATED SELLER!
Features: Sunroof - Anti-Lock Brakes - Alarm - Power Locks - Airbags One Owner - Air Conditioning

Date Posted: 12/27/99
Sold As: By Owner
Price: $ 13,000.00
Category: Four-Door Sedan
Color: Black
Milage: 19,000
Condition: Used
VIN: 3VWVB81H1WM631278

Contact: Jennifer Hansen
Email: jenhansen@hotmail.com Reply to this ad
Phone (Evening): (510) 831-2474
Location: Alameda, CA 94501
Other Ads: Listings from Jenhansen47
Ad ID automobiles-943045325-15220
Pricing: Used Car Pricing
Insurance: Insure this car
Finance: Finance this car

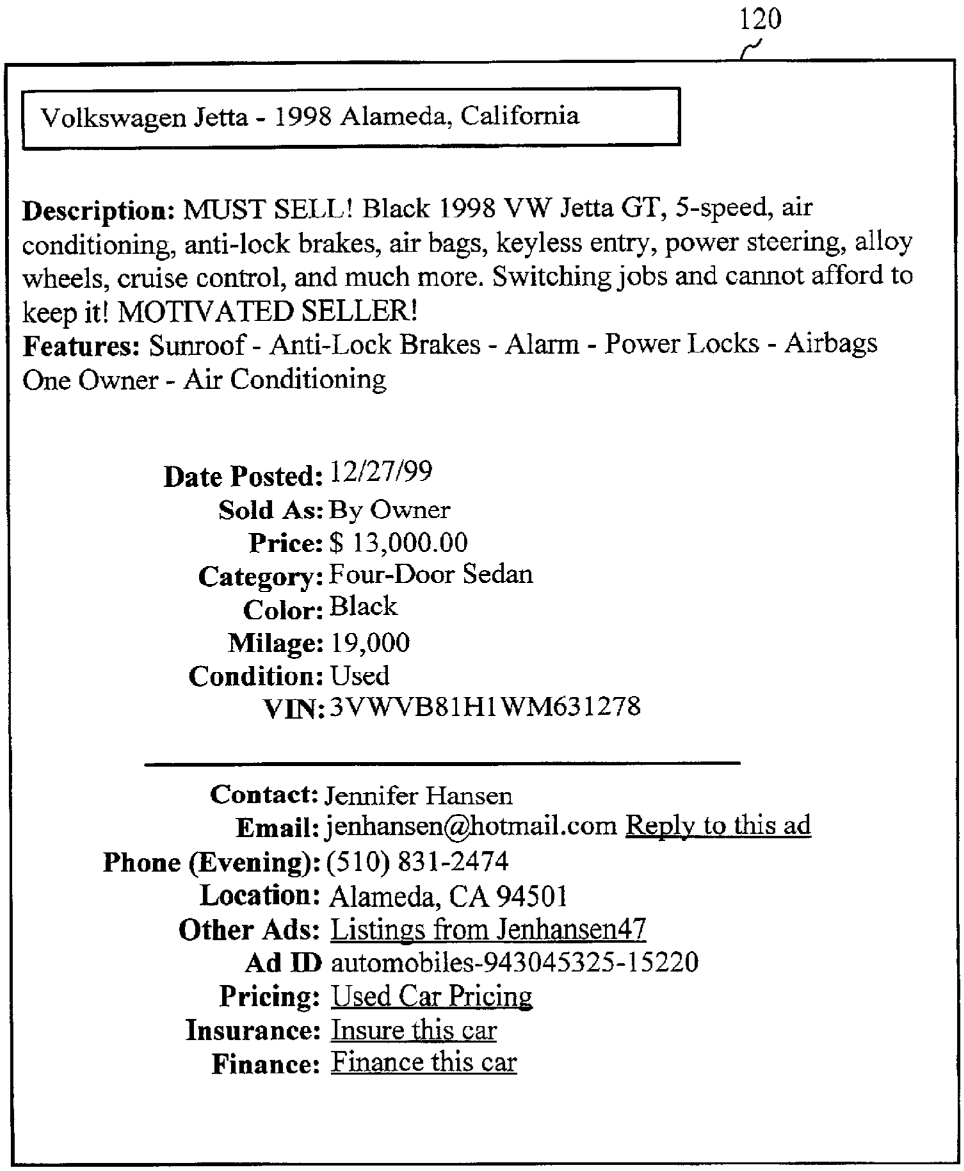

*FIG. 8*   PRIOR ART

INTERNET-ENABLED LEAD GENERATION

CROSS-REFERENCE TO RELATED APPLICATIONS

This application is based on provisional application 60/116,445 filed Jan. 19, 1999, which is herein incorporated by reference.

FIELD OF THE INVENTION

This invention relates generally to a method for obtaining a list of potential purchasers to be used as targets of direct marketing. More particularly, it relates to an Internet-based system for identifying potential future purchasers based on Web-accessible data that is not necessarily related to past or stated purchases.

BACKGROUND ART

Direct marketing is an efficient method of selling that was introduced in the 1960's to take advantage of developments in automation and the study of advertising. Rather than advertise to the general population, marketing efforts are focused on those most likely to purchase, leading to much more cost-effective sales techniques. Based on scientific advertising principles, direct marketing is serviced by increasingly more automated warehousing, shipping, and collection techniques. The phrase was coined in 1961 by Lester Wunderman, commonly regarded as the father of the direct marketing field.

As stated by Wunderman, direct marketing is only effective when certain conditions are met. A prospect must have the ability, willingness, and readiness to buy before a direct sale can be consummated. These three conditions are illustrated using a traditional concept in sales and marketing, the sales funnel, illustrated in FIG. 1. Marketers attempt to develop an ideal customer profile and suitable means for communicating with the ideal audience, such as direct mail, telephone solicitations, advertising in trade publications, trade shows, or seminars. Those likely to be interested in a given product or service are termed suspects. Suspects that express an interest in the offer, i.e. a willingness to purchase, are known as prospects. Those prospects with the financial ability to purchase are called qualified prospects. Intenders are qualified prospects that are ready to purchase in the near future, and it is from the intenders that customers are finally generated. Of course, the sales funnel is a broad concept, and the order in which the three conditions (ability, willingness, readiness) are applied to narrow the pool of suspects may be rearranged. The basic principle of the sales funnel is that a more efficient movement down the funnel leads to a decreased marketing and sales cost per eventual purchase.

To date, most direct marketing work aims to ascertain the ability to pay, or the qualified prospects. It is relatively straightforward to use demographic or lifestyle data available from third party data enhancement services, such as household income, to determine a suspect or prospect's ability to pay. However, such data provides little information on willingness or readiness to purchase. Such limitations have been addressed by predictive modeling or surveys of buying intentions. Predictive modeling is a statistical technique that uses various attributes about a prospect to assess a likelihood of buying. These attributes include actual or predicted behavior, attitude as determined from surveys, and collected or overlaid demographic data. Those believed to be unlikely buyers are excluded from costly direct marketing programs, while the most likely buyers are the subjects of intense marketing efforts. Predictive modeling provides the advantages of low cost and scalability.

One disadvantage of predictive models is that they may miss key attributes and incorporate stale data. For example, predictive models are often used for predicting purchases of high-ticket items, such as automobiles. However, the intention to buy a new car is often known only after the fact, when new vehicle registration information is available. What is needed is a reliable leading indicator of buying intent. Surveying has been considered the standard for identifying intender leads-consumers with a stated intention of buying a particular class of product within a given time frame. Surveys include questions that assess buying intentions, for example, "Do you plan to buy a new car in the next six months?" The self-reported data is then used to identify intender leads. A significant problem with surveys is that they are inefficient, as measured by the response rate, and expensive, as measured by the cost per completed survey. Furthermore, a link between a consumer's stated future intention and actual action is somewhat tenuous.

Both predictive models and surveys also suffer from a delay between lead generation and distribution to a sales force for pursuit. Even if the leads are of high quality, by the time that they can be distributed using traditional methods, the leads are no longer "hot," i.e. the purchase has already been completed.

With the rapid growth of the World Wide Web in recent years, a large amount of effort has been devoted to using the Web for advertising and for collecting marketing and demographic data. When a consumer accesses a web site, the web server often sends a cookie along with the requested page. The cookie is a text string that may be saved to the user's hard drive, and is then read by the web server when the user accesses the same site. The cookie can be used to record user preferences or browsing history. Many web sites have banner ads along the top of the page that are provided directly by an advertising company, which sends a cookie along with the banner ad. Advertising companies use cookies to determine what advertisements the user has already seen, so that the same advertisement is not displayed twice, and also to track the user's browsing history, a potentially useful indicator of the user's interests. Before sending a banner ad to a user, the cookie is read to determine the most effective advertisement to send.

Direct marketers have long collected databases of lifestyle data of people, such as household income, number of children in the family, and hobbies and interests. Examples include Polk's Lifestyle Selector, Acxiom's Infobase, or Metromail/Experian's INSOURCE$^{SM}$. Now that online behavior can be tracked, and often linked to a person's name, home address, and telephone number, databases containing both online and offline behavior data are being collected. Such information gives direct marketers a rich picture of a user, as well as a variety of means to target consumers, including mail, telephone, email, and banner ads. While the information that is currently gathered is useful for profiling consumers, it does not address the problem of generating intender leads. That is, the information does not indicate buying intent, but rather records past purchases and behavior. Similarly, the information used to determine which banner ad to send is based on past behavior and interests, and is not based on indicators of future purchases.

OBJECTS AND ADVANTAGES

Accordingly, it is a primary object of the present invention to provide a cost-effective method for generating large numbers of intender leads.

It is a further object of the invention to provide a method that uses indicators of future purchases to generate intender leads.

It is an additional object of the invention to provide a method that takes advantage of the large amounts of demographic and psychographic data that is available on the Internet and that is constantly being updated.

It is another object of the present invention to provide a method for generating intender leads that is highly scalable.

It is an additional object of the present invention to provide a method that uses a just-in-time delivery system to deliver the intender leads to the desired location so that they can be used for direct marketing while they are still "hot."

Finally, it is an object of the present invention to provide a method for generating intender leads that takes advantage of existing direct marketing databases containing full contact and other information to enhance the data that can be extracted from the Internet.

SUMMARY

These objects and advantages are attained by a method of generating an intender lead in a distributed computer system, preferably the Internet. The present invention is used to identify large numbers of "hot" intender leads cost effectively, and to distribute them efficiently to a sales force using a just-in-time delivery system. The invention relies on the wealth of continuously updated demographic, psychographic, and behavioral data available on the Internet that can be mined for sales prospects. Once identified, the relevant information identifying the prospect can be extracted and enhanced with direct marketing databases to generate intender leads.

The method contains the following steps: identifying purchase indicators representing potential future purchases by prospects; and extracting prospect identifiers, preferably telephone numbers, email addresses, or postal addresses, from the purchase indicators. The prospect identifiers uniquely identify the prospects, which include the intender lead. The purchase indicators are contained within files in the distributed computer system, which are preferably classified advertising, resumes, auction boards, life change announcements, and postings to newsgroups, discussion forums, and email lists. Purchase indicators include classified automobile sales advertisements, representing future automobile, insurance, or roadside assistance package purchases; classified home sales advertisements, representing future purchases of homes, insurance, telephone or moving serves, or furniture or other large-ticket items; classified boat and RV sales advertisements, representing future purchases of leisure products; resumes, representing future purchases of financial planning services including 401(k) rollover services, or purchases of business products appropriate for the company or job title on the resume; bids for auctioned items, representing future purchases of products or categories corresponding to the bids; requests for purchase recommendations, representing purchases of products corresponding to the requests; engagement or wedding announcements, representing home, household appliance, home insurance, or life insurance purchases; birth announcements, representing infant product purchases; and obituaries, representing financial planning service purchases by a surviving family member.

Preferably, a predictive model is applied to the prospects to select the intender leads. A profile database may be used to obtain additional information, preferably contact information or data enhancement information, associated with the prospects. In the profile database, the additional information is associated with the prospect identifiers. A predictive model may by applied to all types of additional information to select the intender leads from the prospects. The method may also include the step of extracting auxiliary data from the purchase indicators. The auxiliary data is independent of the prospect, and may contain information about the indicator itself or about the potential future purchase. For example, the auxiliary data may be a classification of a product or category of the potential future purchases. The predictive model may also be applied to the auxiliary data to select the intender leads from the prospects.

Preferably, the method also has the step of transferring the intender leads or contact information for the intender leads to an interested party. The transfer preferably occurs before the potential future purchase. Alternatively, a direct marketing contact with an intender represented by the intender lead may be initiated.

The present invention also provides a program storage device accessible by a server machine in a distributed computer system, preferably the Internet. The storage device tangibly embodies a program of instructions executable by the server machine to perform method steps for generating an intender lead. These method steps are the method steps of the present invention as described above.

BRIEF DESCRIPTION OF THE FIGURES

FIG. 3 shows a prior art web page for searching online automobile classifieds.

FIG. 5 shows an excerpt from a prior art classified advertising web page.

FIG. 8 shows a prior art web-based classified advertisement.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
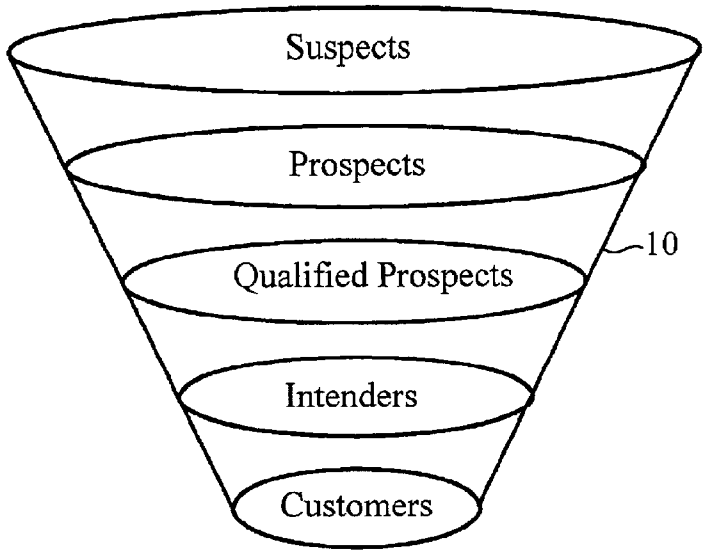
FIG. 1 is a schematic diagram of a sales funnel as known in the prior art.

The present invention provides a method for generating intender leads—leads for people with a stated or likely intention of purchasing a particular product within a given time frame. The intender leads are then used as targets of diversified direct marketing campaigns. The present invention considers two of the categories included in the sales funnel 10 of FIG. 1. First, prospects are located-people with some likelihood of making a purchase in the near future. In the present invention, prospects are identified by their association with a purchase indicator, an indicator of a potential future purchase. From the pool of identified prospects, intender leads are generated using predictive models. All of the prospects may be intenders, but it is preferable that the list of prospects is furthered narrowed to generate intender leads. The specifics of the implementation of the invention differ depending on the particular domain of application. However, the basic principles of the invention may be applied to any domain by recognizing appropriate purchase indicators for each domain. A primary application domain is automobile purchases, for which classified advertising for automobile sales is used as a purchase indicator.

Figure 2:
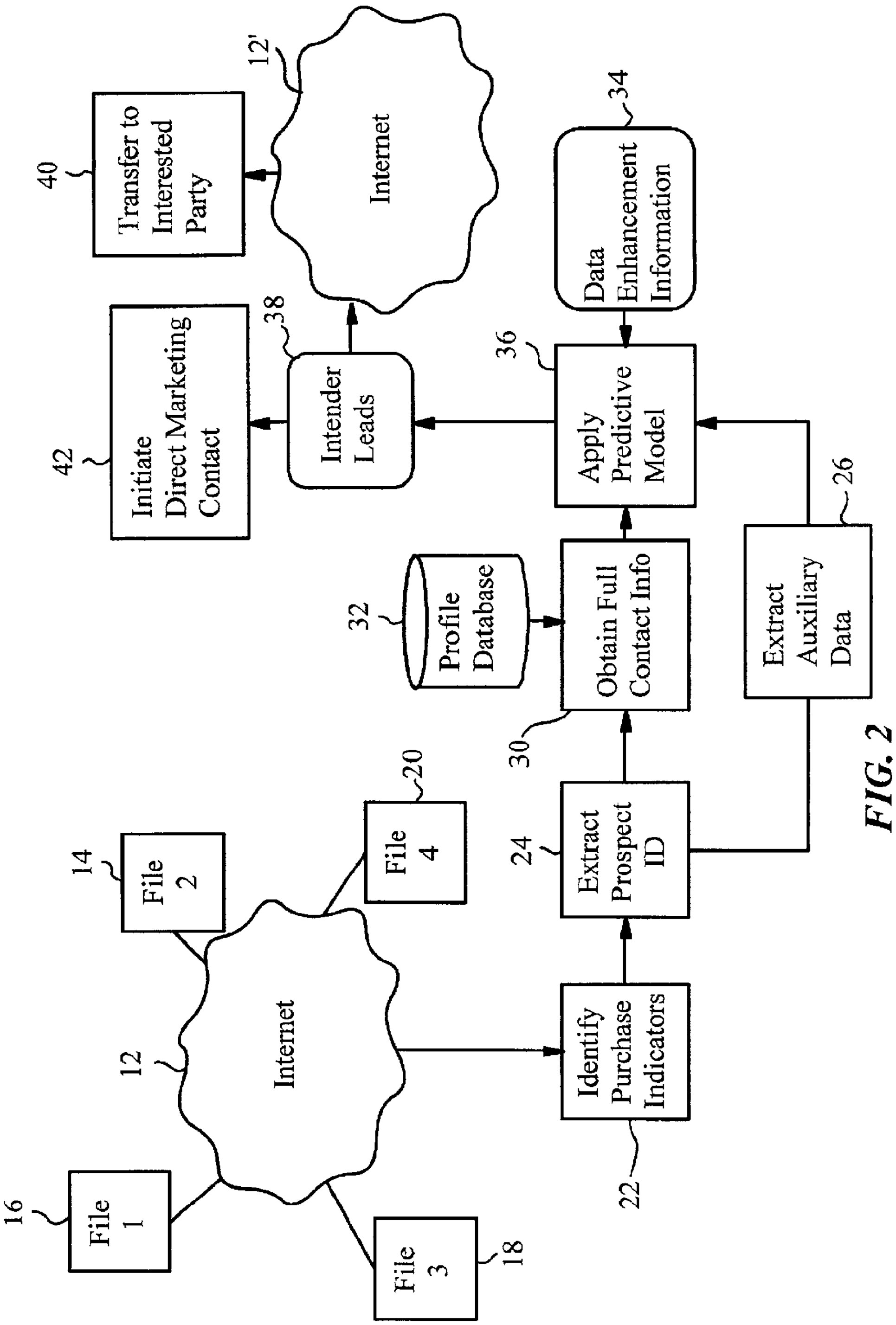
FIG. 2 is a block diagram of a method of the present invention.

A preferred embodiment of the invention is shown in FIG. 2, a block diagram of the method of the present invention occurring in the Internet 12. While the present invention may occur within any distributed computer system, the Internet is preferable, because it is a publicly accessible source of information about the general public. In particular, the Internet provides access to continuously updated demographic and psychographic data that can be correlated with sales intentions. Within the Internet 12 are files or documents 14, 16, 18, and 20 that contain purchase indicators—indicators of potential future purchases by prospects. Files 14–20 may be any types of file containing purchase indicators. Typically, files 14–20 will be text files or documents, but they may also be image, audio, video, database files, tables, or other media files. Preferably, files 14–20 contain classified advertising, resumes, auction boards, life change announcements, or postings to newsgroups, discussion forums, or email lists. Files 14–20 are typically accessed through a publicly accessible web site.

An important step in the present invention is determining appropriate purchase indicators for the desired future purchase. Appropriate purchase indicators must be leading indicators; that is, they must represent a near future purchase, so that direct marketing can occur when the intender is contemplating a purchase, but before the purchase is completed. In the case of automobile purchases, our proprietary studies have shown that classified automobile sales advertisements are a useful leading indicator, because more than half of all car sellers are also contemporaneously purchasing vehicles. Automobile sellers are also likely to purchase automobile insurance or roadside assistance packages. According to the Newspaper Association of America, private individuals sell more than 42 million vehicles each year in the United States. A variety of Internet-accessible classified sources are available, including Internet-only classified web sites, Web-based newspaper classifieds, and Internet discussion forums, such as newsgroups or mailing lists, in which automobiles are listed for sale by the owners. Most United States newspapers are accessible over the Internet, with the same or slightly different content. Many web portals, such as Yahoo, also contain classified listings that are not taken from newspapers, but that users enter directly into the web site.

After the desired sources 14–20 have been located, purchase indicators are identified from files 14–20 in step 22. Step 22 may be performed using an automated spider that has been designed to locate the particular part of the file containing the classified advertisement. A particular spider will be discussed further below. The purchase indicator (e.g. individual classified advertisement) may be downloaded from the Web onto a server by the automated spider for further processing. The automated spider must be tailored to each particular web site, because advertising is accessed differently from each web site. Each potential web site must first be accessed manually to learn how an individual advertisement is obtained. Typically, advertisements are either directly accessible by following hyperlinks, or behind a CGI script, accessible only by entering a search string into a text bar or clicking a search button. FIG. 3 shows a web page 50 of an exemplary classified site. A variety of scroll boxes 52 are displayed, in which a user selects the type of automobile desired, and a search is performed when the user clicks the Submit button 54. Both types of advertisements (hyperlink and script) may be accessed using an automated spider. The automated spider may access each web site with any desired frequency, which may depend upon the frequency at which the web site is updated.

Each purchase indicator identified in step 22 contains a prospect identifier, such as a telephone number, email address, or postal address, that uniquely identifies the prospect for a potential future sale. In typical newspaper classified advertisements, only a telephone number is included. In step 24, the prospect identifier is extracted from the purchase indicator. The listed telephone number often does not include an area code, and further processing is needed to obtain a full telephone number. For example, listings in a local newspaper often exclude the local area code unless the seller's area code is different (e.g. from a nearby area with a different area code). In the case of automobile advertisements, in which the goal is to identify automobile intender leads, a further step of excluding classified advertisements of automobile dealers is necessary. A table of car dealer telephone numbers can be created, seeded with telephone numbers mentioned multiple times in the same edition of the classifieds or with numbers from an advertisement referencing multiple vehicles. Conventional direct marketing telephone number lists of car dealers can also be purchased and used to identify and suppress dealer listings.

Telephone direct marketing can be conducted using only a list of the full telephone number obtained from the purchase indicator. That is, the list of generated intender leads may be a list of telephone numbers or other prospect identifiers obtained in step 24. However, for the present invention, it is preferable that further data analysis and enhancement be conducted in order to select a group of intenders from the full list of prospects. Without further analysis, it is likely that only a small percentage of the intender leads will produce actual customers. With further analysis described below, it is possible to generate a list of intender leads for which a much larger percentage will be customers.

Preferably, in step 26, auxiliary data is extracted by the spider from the purchase indicators identified and downloaded in step 22. The auxiliary data is independent of the prospect. For example, for automobile advertisements, auxiliary data may be information about the vehicle being sold. Such information may be useful for determining lifestyle characteristics of the prospect, or for determining the type of vehicle the prospect is likely to purchase next. Typically, this information is in a semi-structured format that is not useful for large-scale analysis. Classified advertisements usually contain cryptic abbreviations and acronyms to save space, and this information must be identified and translated into a standard format in step 26. Extraction and translation of auxiliary information is highly tailored to the particular type of purchase indicator used.

In step 30, full contact information is obtained for the prospect using a profile database 32. Profile database 32 contains a list of prospect identifiers, such as telephone numbers, associated with names, addresses, and other information. Direct marketing companies such as The Polk Company or Metromail offer services to append the name and home postal address associated with a telephone number; this service is known as a reverse white pages lookup. Most commonly, the information provided is the name and address found in conventional telephone book white pages. Typically, 35–40% of telephone numbers can be tied to a name and postal address in this way. Internet white pages web sites, such as InfoSpace (www.infospace.com) offer the same service free of charge. Locating contact information for unlisted telephone numbers is more difficult, but in some cases this information may be obtained from self-reported survey information or other sources. For example, product registration information often contains unlisted telephone numbers. Combining all available examples of profile database 32 may result in match rates of between 40 and 50%. It is to be understood that profile database 32 may be a single source or a combination of sources such as web sites, locally owned databases, or direct marketing services.

Other information, such as data enhancement information 34, may also be obtained from profile database 32 or other suitable source. As used here, the term data enhancement information includes behavioral, demographic, and psychographic information. Traditionally, such data enhancement has been performed using services such as Polk's Lifestyle Selector, Acxiom's Infobase, or Metromail/Experian's INSOURCE℠, or databases from infoUSA or Dun & Bradstreet. These services record information such as household income, hobbies, and past purchasing habits. Currently, databases are being collected to link typical "off-line" data with online behavior data. Such databases include 24/7 Media's Profilz™ database, which stores information such as web surfing behavior (sites visited and time per site), participation in Internet discussion forums, and on-line registration information. When a consumer registers a purchase of a product at a company's web site, off-line identification can be associated with online habits to obtain a very broad characterization of a particular user.

A predictive model is applied in step 36 to contact information obtained in step 30, and preferably also to data enhancement information 34 and auxiliary data extracted in step 26. Step 36 generates a set of intender leads 38 from the set of prospects obtained from the purchase indicators. Predictive modeling is a technique known in the art that is used to better assess a prospect's likelihood of making a purchase. A comprehensive overview of predictive modeling techniques is available in David Shepard Associates, *The New Direct Marketing: How to Implement a Profit-Driven Database Marketing Strategy,* 2nd Ed., Irwin Professional Pub., New York, 1994; and Banslaben, John, "Predictive Modeling," pp. 620–636, in *The Direct Marketing Handbook;* 2nd Ed., Edward Nash, ed., McGraw-Hill, Inc., New York, 1992.

For example, selling a vehicle is a major indicator of intention to purchase a car: our preliminary studies indicate that more than 50% of car sellers plan to purchase a vehicle within thirty days of listing their old car for sale. However, in some cases, a car seller may have already purchased a vehicle prior to listing the car for sale, or is selling a vehicle with no intention of buying another car. Predictive modeling can be used to better assess a car seller's likely course of action. A predictive model uses certain attributes of the seller to predict whether the seller is likely to buy a new car, used car, or no vehicle. Suitable attributes include make/model/year of the vehicle being sold, household income, presence of spouse or children in the home, and various other lifestyle metrics. A more sophisticated model can be used to predict which vehicle a car seller is likely to buy. This is particularly important so that sales and marketing efforts can focus on the right intenders. For example, a BMW dealership should not waste time trying to sell a vehicle to a potential buyer who doesn't have sufficient income to afford the car. Similarly, a family is unlikely to purchase a two-seat sports car.

Finally, in step 40, intender leads 38 are transferred to an interested party, preferably using the Internet 12'. Because intender leads 38 are "hot," they are preferably transferred to the interested party as soon as possible, and most preferably before the potential future purchase is completed. For example, leads 38 may be emailed or faxed to the interested party at scheduled intervals, or they may be located at a secure web site accessed only by those given permission. The interested party is usually a field sales force, but may be any person, group, or organization interested in sales or marketing of the particular product referred to by intender leads 38. Alternatively, in step 42, intender leads 38 may be used to initiate a direct marketing contact.

Intender leads 38 that are transferred to the interested party may contain varying amounts of information. For example, they may contain only contact information (name and address), or they may also include data enhancement information or auxiliary data about the type or product of the future purchase. They may also contain results of predictive modeling, such as specifics, e.g. car model, of a likely future purchase. As desired, intender leads may also include a portion or all of the purchase indicator, so that the interested party may perform additional modeling and analysis. Note that the term intender refers to a person who intends to make a purchase, while the term intender lead refers to the information that is transferred, or the person as identified as a lead for marketing contacts.

Figure 4:
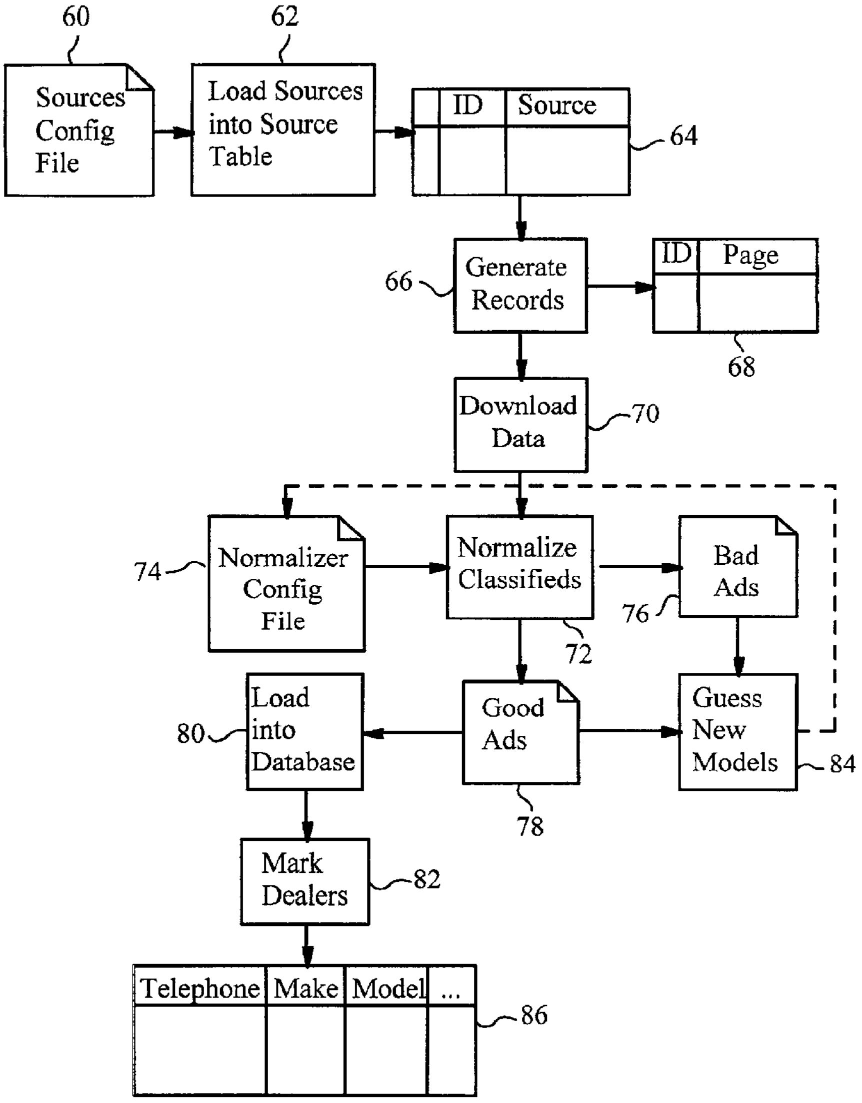
FIG. 4 is a block diagram of a method for extracting prospect identifiers and auxiliary data from classified advertisements according to the present invention.

Steps 22, 24, and 26 must be specialized for each particular domain of interest. An automated spider can be designed to perform the steps automatically for a given domain. One example of a spider is known as the Web Auto Classifieds Aggregator, shown schematically in FIG. 4. The Aggregator is located on a server computer within the distributed computer system. The spider of FIG. 4 is used for traditional classified advertising, as shown in FIG. 5, typically found on web sites of standard newspapers, such as the San Francisco Chronicle. Listing page 90 of FIG. 5 looks like a typical newspaper classified advertisement, with cryptic words and acronyms. The automated spider must be able to extract information from the variety of words and formats included. Note that each individual listing contains different types of information; only the first lists the number of doors and speeds, while only the fourth contains color information (blk/blk). The same word is abbreviated in multiple ways, such as Snrf or sunrf for sunroof. Abbreviations such as nu, excl, exc, tim, obo, and pwr are used. Telephone numbers are listed with different formats. The automated spider translates this semi-structured information into a structured format.

Referring again to FIG. 4, the first component of the Web Auto Classified Aggregator is the web classified sources configuration file 60, used to locate the sources, i.e., documents 14–20 of FIG. 2, containing purchase indicators. In a preferred embodiment, these sources are defined in configuration file 60 according to the following definition records:

```
#
#   Source:        Source Name, City, State
#   Source URL:    Base URL of source
#   Area Code:     Area code of source
#
#   Start Marker:  [Optional] Ignore text before this string
#   Stop Marker:   [Optional] Ignore text after this string
#
#   Ads URL:       full/partial URL (from base) to classifieds
```

-continued

| | | | |
|---|---|---|---|
| # | Old Ads URL: | [Optional] full/partial URL (from base) to classifieds | |
| # | | | |
| # | Remaining URL | Description | |
| # | Remaining URL | Description | |
| # | | | |

In step 62, the sources included in file 60 are loaded into a database source table 64, and an ID is generated for each source. Table 64 is used to generate (step 66) a page table 68 that contains a record for each potential web page located within each source. Each source web page is downloaded in step 70 onto the server into a specified directory, tables 64 and 68 are used to locate the desired pages. In step 72, the classifieds are normalized: individual advertisements are extracted from each page, and the prospect identifier and auxiliary data are extracted from each advertisement. An attempt is made to obtain values for a set of specified fields, such as automobile make, model, year, mileage, and price. A normalizer configuration file 74 specifies how to divide pages to locate individual advertisements, and also contains a list of car makes and mappings of models to makes. Common misspellings are specified explicitly in file 74, and a reverse mapper maps misspellings to a single correct spelling. Depending on what data is required to be extracted, other information may also be included in configuration file 74. For each required field, the normalizer program "guesses" which fragment of the advertisement corresponds to a particular field, using configuration file 74. For example, the guess for the price field has two conditions: a number and a dollar sign. The advertisement is then rated for confidence in the guesses: high confidence corresponds to one guess for each field, two guesses for one field, or two guesses for two fields. All other advertisements receive a low confidence rating. Normalized high confidence advertisements are stored in a "good" file 78, and normalized low confidence advertisements are stored in a "bad" file 76. Bad file 76 may also contain records of advertisements lacking required fields, such as telephone number or other prospect identifier or car make.

The data in good file 78 is loaded into a database table 86 in step 80. If there is already a row in the table with the same telephone number, make, and model, the record is assumed to be a duplicate; this occurs when the same advertisement runs for multiple days or weeks. Next, in step 82, records identified as belonging to dealers are flagged, either by comparing telephone numbers with a database of dealer telephone numbers, or by locating multiple records with the same telephone number. Dealer records may be deleted from table 86 or kept in with a flag, and dealer telephone numbers may be recorded in a file for future use. Note that table 86 does not yet include full contact information or data enhancement information corresponding to the prospect identifier. Table 86 stores information for prospects, which will be analyzed with a predictive model to select intender leads.

Files 76 and 78 may be used to identify models that are not already contained in configuration file 74. Apparent models that occur repeatedly, or various misspellings of models, are added to configuration file 74 in step 84. In this way, configuration file 74 is constantly updated to include a wider range of makes and models.

Figure 6:
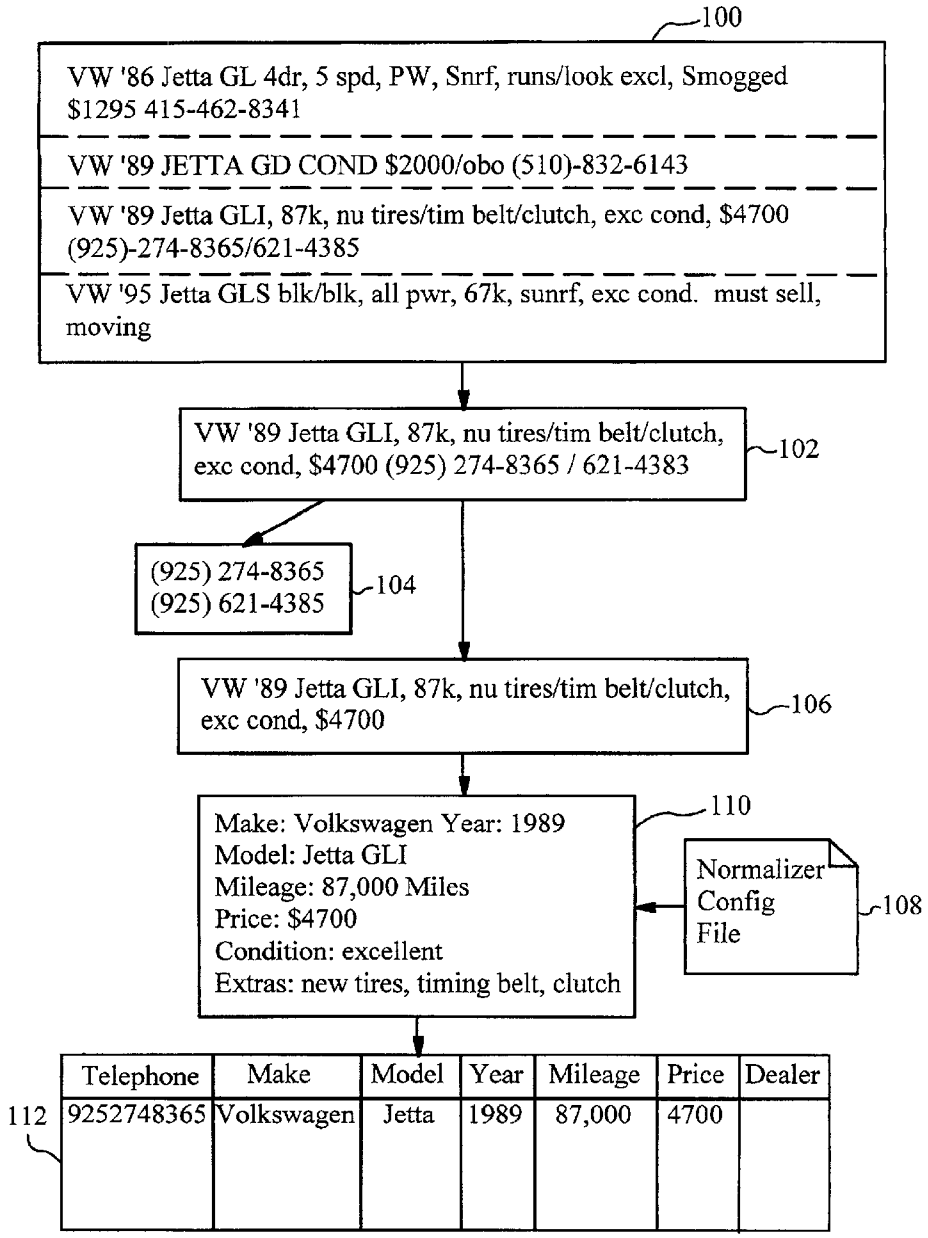
FIG. 6 illustrates the normalization of a classified advertisement.

FIG. 6 illustrates in more detail the normalization step 72 of FIG. 4, as well as steps 22, 24, and 26 of FIG. 2. Classified page 90 of FIG. 5 is divided into individual advertisements, as shown by the dotted lines of page 100 in FIG. 6. A particular advertisement 102 is identified, and telephone numbers 104 and auxiliary data 106 are extracted from advertisement 102. The first telephone number listed has an area code, but the second telephone number does not have an area code. In this case, the same area code is appended to the second telephone number, rather than the area code of the city of the newspaper. Normalizer configuration file 108 is then used to guess the words and phrases of advertisement 106 to assign to each required field. The guessed phrases are expanded as necessary (e.g. 87k becomes 87,000) to arrive at normalized data 110, which is then added as a record in database table 112.

Figure 7:
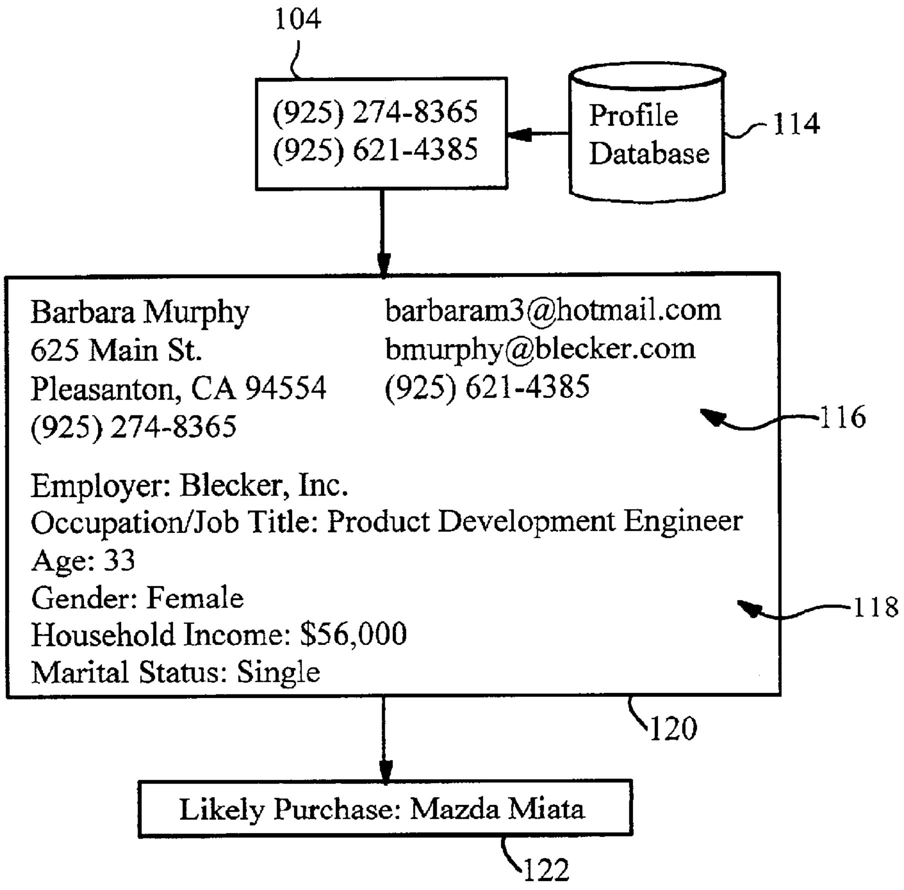
FIG. 7 shows a prospect identifier and associated contact information for a prospect.

As shown in FIG. 7, prospect identifier 104 is located within a profile database 114 to obtain contact information 116 and data enhancement information 118 for the prospect, Barbara Murphy. A predictive model may be applied to combined information 120 and auxiliary data stored in table 112 to determine whether the prospect is an intender, and thereby gather a list of intender leads from the list of prospects. Combined information 120 is an example of an intender lead that may be sent to the interested party. The intender lead may also contain a likely purchase 122, determined by applying a predictive model. An intender lead may contain all or some of the information in combined information 120 and likely purchase 122, or it may include the auxiliary data or other information, depending upon the needs of the interested party, data availability, or economic constraints.

FIG. 8 shows an alternate type of classified advertisement 120, located on an Internet-only classified site, such as Yahoo. Advertisement 120 is much easier to process, because the information has already been formatted into a highly structured file. All of the required fields are listed without abbreviation and in particular locations. The spider for the source containing advertisement 120 must be programmed to access each particular field, and guessing is not required. Advertisement 120 also contains full contact information.

Intender leads for any other domain of interest may be generated using the present invention. Appropriate purchase indicators, both active and passive, and the sources containing such indicators, must be determined, and spiders written. Active indicators are those created by the prospect, and passive indicators are determined without the prospect's input. One example is moving, which has been identified by direct marketers as an important life event that triggers the purchase of numerous products and services. New movers are more likely to purchase home owner's insurance, furniture, appliances, automobile insurance, telephone and moving services, and other home products. According to the National Association of Realtors, approximately 4.7 million existing single-family homes were sold in the United States during 1998. There is therefore a substantial opportunity for direct marketers serving this market.

The present invention takes advantage of this large pool of prospects by identifying listings of homes for sale as purchase indicators. Listings are available on real estate, classified, and local multiple-listing web sites. Often, listings provide the street address of the property for sale, in addition to the name and telephone number of the agent listing the property. The name and telephone number of the owner or occupant is often not available. In some cases, the listing may refer to only a neighborhood within a city, or not even include the city, state, or zip code. If available, the address of the property may be used to determine the name and telephone number of the owner and relevant demographic data from a direct marketing service, such as Polk's LifeStyles or Experian's INSOURCE$^{SM}$. In prior art methods for generating intender leads for movers, post-moving indicators, such as property sale records, are used. These leads may be several months old, and therefore much less valuable than leads generated by the present invention, which indicate future moves.

Classified advertisements can be used as purchase indicators for many products, not simply home- or auto-related products. For example, sellers of boats or recreational vehicles (RVs) are often likely to purchase leisure products in the future. Leisure products include boat accessories, outdoor clothing, and camping equipment, or any product useful in an RV or boat. These classified advertisements may be processed in a manner similar to the processing of automobile advertisements described above. Purchase indicators of the present invention may be classified advertisements for any products, and are not limited to examples specifically listed.

An additional source for prospects and intender leads are job changers, who are candidates for an array of direct marketing offers, such as 401(k) rollover services or other financial planning services. For an active purchase indicator, resumes posted to career web sites can be used. Typically, all contact information, including name, home address, home telephone number, and email address, can be extracted from online resumes, as well as educational and career data.

A passive indicator of a job changer is a newly undeliverable work email address. Since email addresses may be undeliverable for both transient and permanent reasons, it is necessary first to process the undeliverable notification to identify the reason an email address is invalid. In the standard convention used for business email addresses (e.g. user-id@(companyname.com), an invalid user-id may indicate a job change, particularly if the user-id was valid at one time, but is no longer valid. This typically rules out a keying error as the source of the problem. Once identified, email addresses are matched against a database of names, email addresses, home postal addresses, and home telephone numbers to identify the appropriate contact information to use for marketing activities.

Resumes are also useful for obtaining information about a job seeker's current job. Resumes usually contain job titles, company names, and business contact information. Corresponding future purchases include business products appropriate for the company or the job title. For example, accountants at all companies may be future purchases of accounting software.

Figure 9:
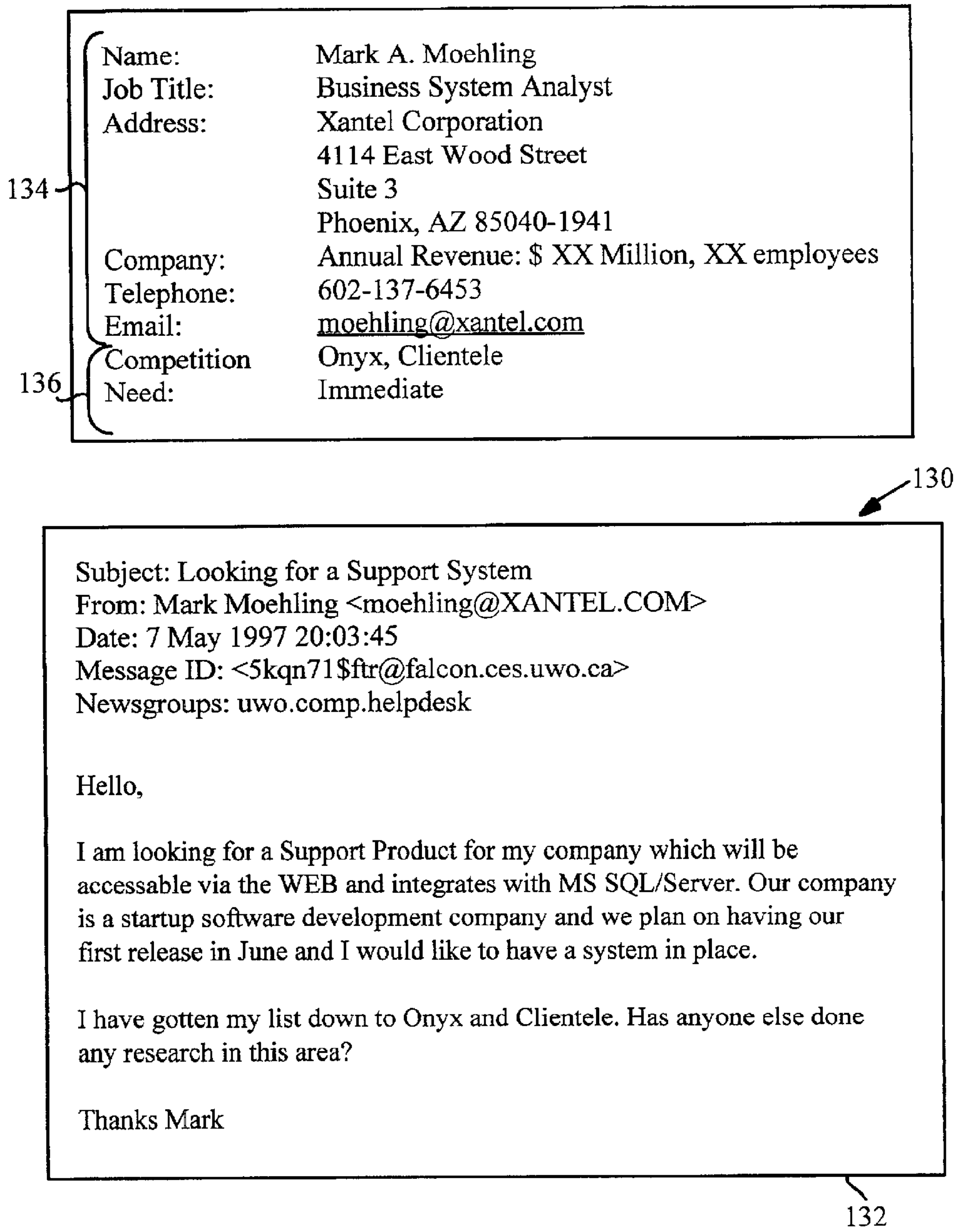
FIG. 9 illustrates an intender lead according to the present invention.

Another large source of purchase indicators are Internet discussion forums, email lists, newsgroups, web bulletin boards, and auction boards, which are typically organized by vocational or avocational interests. Discussion forums, newsgroups, and bulletin boards vary in format, but operate on the same basic principle: a network of users communicate with one another about a particular subject, and each user may access postings written by all other users. For the present invention, purchase indicators are not simply participation in a discussion about a particular subject, but are messages or postings stating an interest in purchasing a particular product or service or a request for purchase recommendations. The potential future purchase is a product or service corresponding to the request. For example, a user intending to purchase an Enterprise Resource Planning (ERP) system for his or her company may ask for advice or opinions about Oracle, SAP, and PeopleSoft. In step 22 of FIG. 2, purchase indicators in discussion forums are identified using natural language processing. For example, the phrase "I am looking for . . . " may indicate that a user intends a purchase. Classification of the product of the potential future purchase must also be performed. Often, the taxonomy of the forum can be used to classify the purchase, but a separate ontology, for example, one that recognizes that SAP is an ERP vendor, may also be applied to the purchase indicator. An ontology for workstation products "knows" that Sun, HP, DEC, IBM, and SGI offer workstations, as well as the myriad product names and model numbers offered by each. Common ways of referring to the product category (e.g. file server, database server, desktop, deskside) are also included. A typical intender lead 130 taken from a discussion forum is shown in FIG. 9. Intender lead 130 includes a purchase indicator 132 that was identified using an automated spider. Purchase indicator 132 is a message that was posted to a helpdesk newsgroup. Posting 132 contains a name and email address, facilitating obtaining full contact information 134. Intender lead 130 also contains auxiliary data 136 identifying the products of potential future purchases.

Web-based auction boards contain similar information. Bids for auctioned items are purchase indicators showing an interest in purchasing the auctioned item or category of item, or similar items. Similarly, sellers listing items for sale at auctions may be purchasing replacement items in the future. For the present invention, auction sellers are similar to people advertising items for sale in classified listings.

Another large source of purchase indicators are life change announcements found in online newspapers. Life change announcements include birth announcements, graduation announcements, wedding or engagement announcements, and obituaries. Local newspapers may contain a larger number of announcements than national, well-known newspapers. Wedding or engagement announcements indicate future purchases of homes, household appliances, or home or life insurance. Birth announcements indicate future purchases of infant products, such as strollers, intercom systems, diaper services, clothing, day care services, and other products and services. Obituaries indicate potential future purchases by a surviving spouse or other family members. Surviving family members often purchase financial services and products, such as investment services.

It will be clear to one skilled in the art that the above embodiment may be altered in many ways without departing from the scope of the invention. Accordingly, the scope of the invention should be determined by the following claims and their legal equivalents.

What is claimed is:

1. A computer-implemented method of automatically generating intender leads, said method comprising the steps of:

a) determining appropriate purchase indicators that are leading indicators for desired near future purchases and defining in a sources configuration file one or more web page sources that contain said purchase indicators;

b) locating and searching, based on step a), said one or more web page sources on the Internet via an automated spider tailored to access said one or more web page sources; wherein said spider is located on a server computer connected to the Internet and wherein said spider for translating semi-structured information into a structured format;

c) obtaining said purchase indicators from said one or more web page sources by downloading each of said one or more web page sources onto said server computer and into a specified directory, identifying and normalizing said purchase indicators according to a normalizer configuration file, and loading normalized high confidence purchase indicators into a database table;

d) extracting prospect identifiers from said purchase indicators obtained in step c), wherein said prospect identifiers identify prospects;

e) obtaining full contact information of each of said prospects;

f) extracting auxiliary data from said purchase indicators via said automated spider;

g) obtaining data enhancement information including behavioral data, demographic data, and psychographic data;

h) applying a predictive model to said full contact information, said auxiliary data, and said data enhancement information stored in said database table to assess each of said prospects' likelihood of making said desired near future purchases, said predictive model for predicting whether and what a seller is likely to buy in near future; and i) selecting intenders from said prospects based on step h), said intenders having a stated or likely intention of making said desired near future purchases in accordance with said predictive model.

2. The method of claim 1, further comprising the step of transferring said intenders selected in step i) to an interested party before said desired near future purchases occur.

3. The method of claim 1, further comprising the step of initiating a direct marketing contact with said intenders selected in step i).

4. The method of claim 1 wherein said prospect identifiers are selected from the group consisting of telephone numbers, email addresses, and postal addresses.

5. The method of claim 1, further comprising the step of obtaining additional information associated with said prospects from a profile database, wherein said additional information is associated with said prospect identifiers in said profile database.

6. The method of claim 1, wherein said auxiliary data are independent of said prospects, and wherein said auxiliary data are semi-structured, further comprising the step of:

translating said auxiliary data into a standard structured format, said translating step is highly tailored to said purchase indicators.

7. The method of claim 1, wherein said one or more sources are selected from the group consisting of classified advertising, resumes, auction boards, life change announcements, and postings to newsgroups, discussion forums, and email lists.

8. The method of claim 7, wherein said purchase indicators comprise classified automobile sales advertisements, and said desired near future purchases are selected from the group consisting of automobile, automobile insurance, and roadside assistance package purchases.

9. The method of claim 7, wherein said purchase indicators comprise classified home sales advertisements, and said desired near future purchases are selected from the group consisting of home, home insurance, telephone service, and moving service purchases.

10. The method of claim 7, wherein said purchase indicators comprise classified boat and RV sales advertisements, and said desired near future purchases comprise leisure product purchases.

11. The method of claim 7, wherein said purchase indicators comprise resumes, and said desired near future purchases comprise financial planning services comprising 401 (k) rollover services.

12. The method of claim 7, wherein said purchase indicators comprise resumes comprising a current job title, company, and contact information, and said desired near future purchases comprise purchases of business products appropriate for said company and said job title.

13. The method of claim 7, wherein said postings comprise requests for purchase recommendations, and said desired near future purchases comprise purchases of products corresponding to said requests.

14. The method of claim 7, wherein said auction boards comprise bids for auctioned items, and said desired near future purchases comprise purchases of items similar to said auctioned items.

15. The method of claim 7, wherein said purchase indicators are selected from the group consisting of engagement announcements and wedding announcements, and said desired near future purchases are selected from the group consisting of home, household appliances, home insurance, and life insurance purchases.

16. The method of claim 7, wherein said purchase indicators comprise birth announcements, and said desired near future purchases comprise infant product purchases.

17. The method of claim 7, wherein said purchase indicators comprise obituaries, and said desired near future purchases comprise financial planning service purchases made by a surviving family member.

18. A digital computer system programmed to perform the method of claim 1.

19. The method of claim 1, further comprising the step of:

obtaining said data enhancement information from a profile database, wherein said data enhancement information is associated with said prospect identifiers.

20. The method of claim 1, wherein said auxiliary data includes a classification of a product of said desired near future purchases.

21. A computer-readable medium tangibly embodying a program of instructions executable by a computer to perform the method steps of claim 1.

* * * * *